Oct. 12, 1965   N. S. ANDERSON ETAL   3,212,092
SIGNAL CORRELATION SYSTEMS
Filed May 16, 1960   3 Sheets-Sheet 1

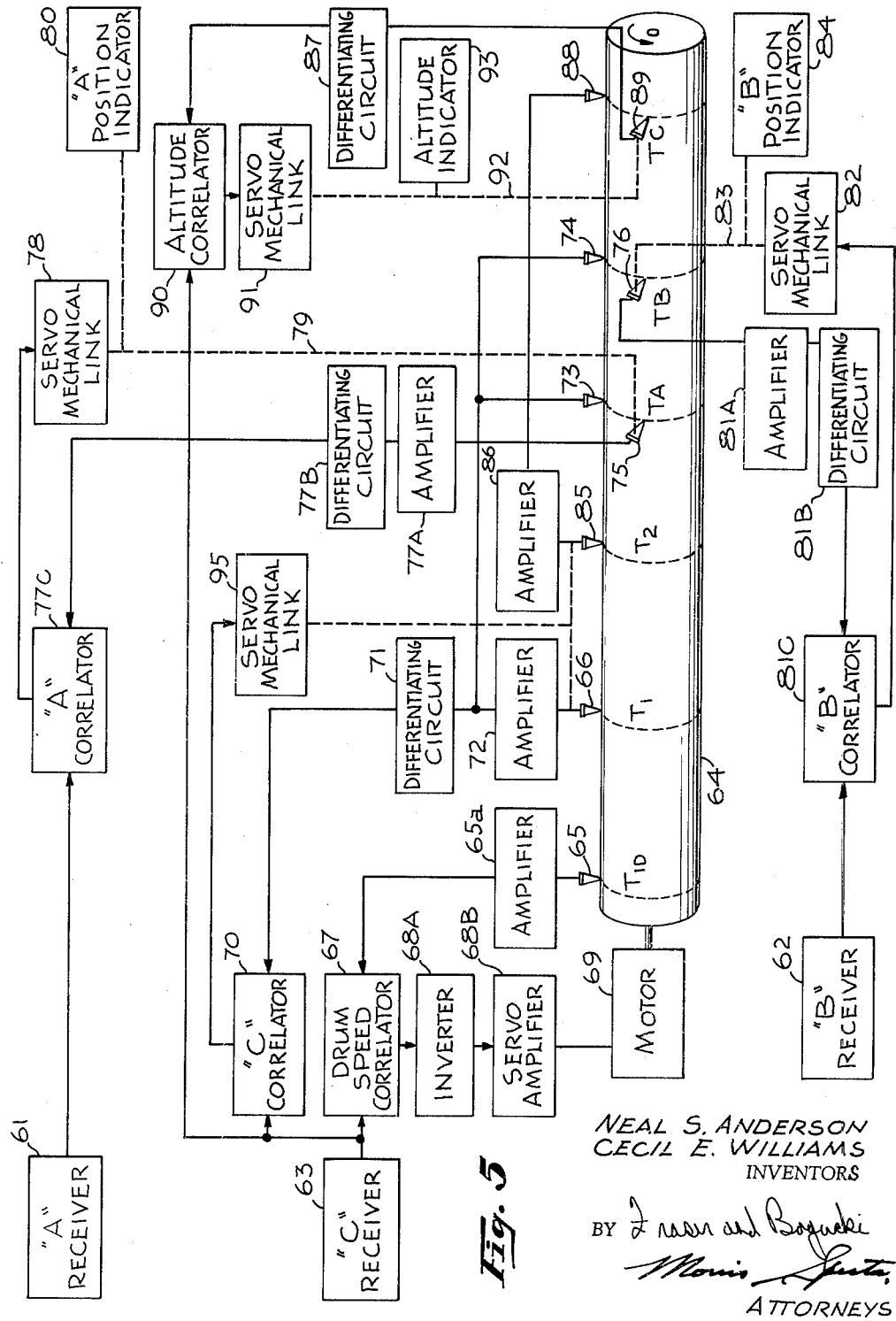

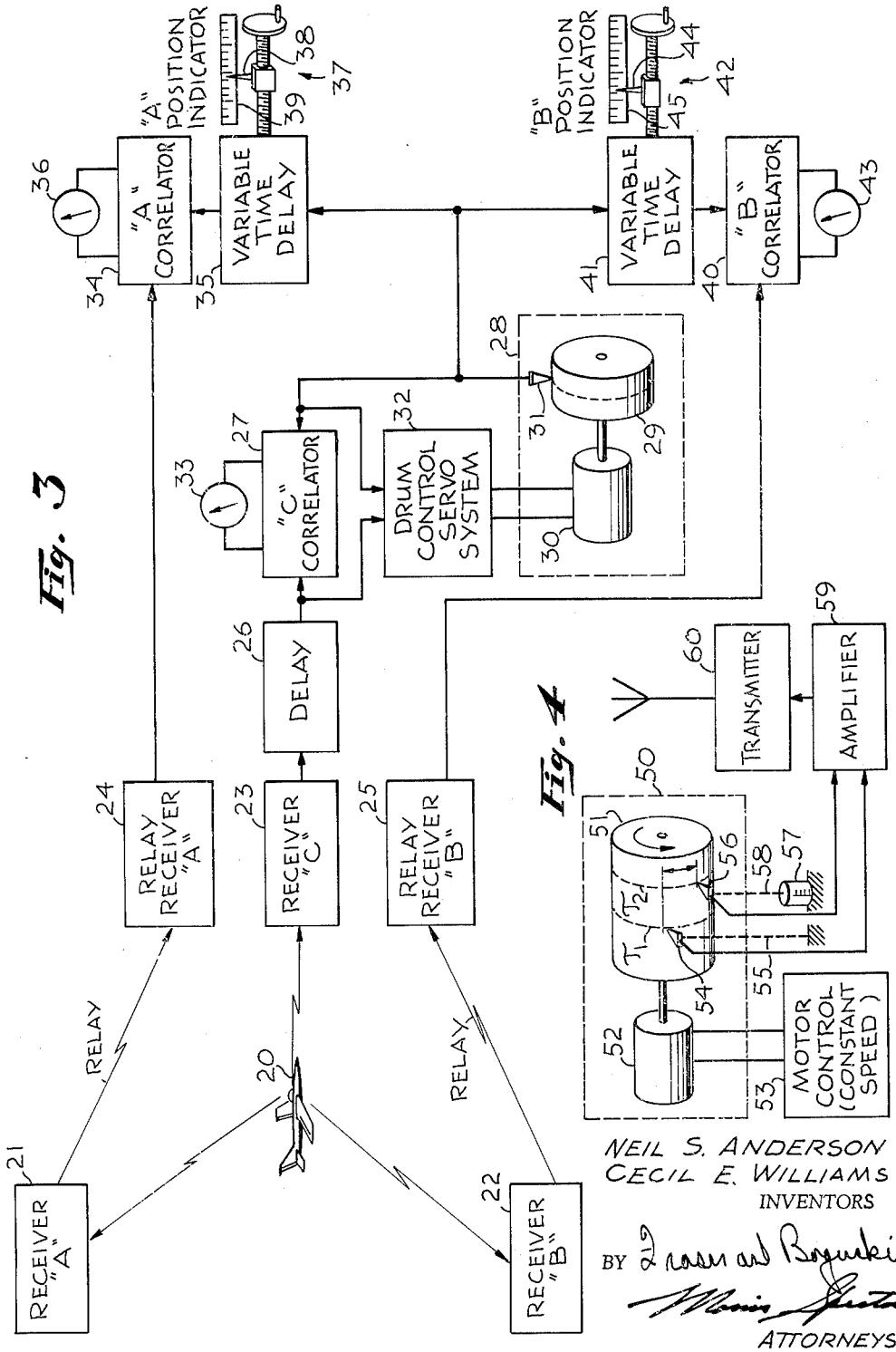

NEAL S. ANDERSON
CECIL E. WILLIAMS
INVENTORS

BY Fraser and Bogucki

ATTORNEYS

3,212,092
SIGNAL CORRELATION SYSTEMS
Neal S. Anderson, Northridge, and Cecil E. Williams, Woodland Hills, Calif., assignors to TRW Inc., a corporation of Ohio
Filed May 16, 1960, Ser. No. 29,538
18 Claims. (Cl. 343—112)

This invention relates to systems for identifying and locating radio transmitting stations and more particularly to a new and improved system for the identification and location of radio signal transmitting vehicles such as aircraft through a process of signal correlation as well as for the transmission of information under adverse conditions.

In the control of air traffic, both in the immediate region of an air terminal as well as at intermediate points, it is well known to employ radio signal transmission systems in which voice messages are relied upon to convey the identification of each aircraft as well as its approximate position relative to a plurality of ground receiving stations. Where traffic is particularly congested, radar systems are frequently employed which provide for an exact positional determination of aircraft present within the range of the radar station but which generally do not afford any means for establishing the identity of the individual aircraft which may at any one time be present. Where a relatively large number of individual transmitters share common transmission frequencies, the reception of voice communication is often difficult due to interferences between the signals. Furthermore, where voice communication is relied upon, the attention of the pilot is required for the confirmation of each transmitted signal between the airborne and ground stations. Since voice communications as a rule do not convey accurate position information and since radar systems do not as a rule convey identification information, it is common practice to employ both voice communication and radar location to ascertain not only the identity but also the position of a given aircraft in a congested region.

Still another problem encountered in the control of air traffic is that associated with the presence of an unwanted aircraft in a particular region which may transmit false identification and position information. Although false identification and position information may increase the likelihood of an air traffic accident, the identification and location of each individual aircraft present is particularly important as a security measure to insure that no enemy aircraft has been able to enter a given region without detection.

The present invention is directed to a new and improved system which may be employed for the control of air traffic by the identification and location of radio transmitting aircraft through a process of signal correlation. Before considering an exemplary arrangement of the invention, brief consideration will be given to the techniques of signal correlation.

Where two signals A and B each contain a complex multifrequency component which conforms to substantially the same amplitude-versus-time function, the signals may be regarded as containing mutually coherent signal components. Frequently signals of the type under consideration may be displaced in timing by some unknown magnitude of relative timing displacement, i.e., the timing of the mutually coherent component of signal A may be such that it commences in advance of, or alternatively, after the beginning of its mutually coherent signal component of signal B.

To determine the value of the timing displacement between two such signals, signal correlation techniques have been found useful. In practicing such techniques, it is conventional to apply both signal A and signal B to a signal correlator in the form of an electrical signal multiplying network in which the two signals are multiplied by one another to produce a product signal. The product signal is then time-averaged or "smoothed" as by being applied to a low pass filter or integrating network exhibiting a substantial time constant. The product signal thus smoothed is sometimes termed a "correlation output signal" since the magnitude thereof is directly related to the degree to which the mutually coherent components of the two signals are in time coincidence or, in other words, the degree to which these mutually coherent components are coextensive or in complete correlation during some interval in the time domain.

The value of an arbitrary unknown magnitude of timing displacement between two such signals may be determined by controllably imposing known magnitudes of relative time delay between the two signals prior to their multiplication in the multiplying network. As the time delay introduced between the two signals is changed over a range of values, the magnitude of the correlation output signal represents the degree to which the mutually coherent components of the two signals are in timing coincidence as they reach the multiplying network. Where the timing displacement equals zero, the absolute value of the correlation output signal magnitude is maximum. Thus, where the mutually coherent components of the two signals are in synchronism with one another, and the signals contain mutually coherent frequency components, a maximum correlation is achieved. By measuring the value of the relative time delay introduced between the signals which produces the maximum, the value of the arbitrary unknown magnitude of timing displacement between signal A and signal B may be determined.

A system for the identification and location of radio signal transmitting stations in accordance with the present invention possesses unique advantages through the use of coded signals which are subjected to signal correlation processes. One particularly desirable coded signal possessing unique advantages is that which is obtained through a selection of a particular segment of the signal provided by a random noise source. As is well known, random noise appears as a generally spurious signal across certain types of resistance elements due to the random nature of the electron movement therein. Another well known source of random noise is that which is encountered in electron tubes which arises due to the motion of electrons and particles within the tube. Since an infinite number of different samples may be obtained from a random noise source, in accordance with the present invention to be described below, suitable coded signals may be derived from a random noise source which are then subjected to signal correlation processes for the identification and location of a radio signal transmitting station, as well as for communication of other intelligence from the transmitting station to a point of signal reception.

It is a principal object of this invention to provide a new and improved signal communication system which, among other things, is useful as an identification system for determining the identity of an unknown radio signal transmitting station.

It is an additional object of the present invention to provide a new and improved system for use in the identification and location of radio transmission stations by signal correlation techniques.

It is yet another object of the present invention to provide a new and improved radio signal communication system useful in communicating intelligence under adverse signal-to-noise conditions and hence over long distances.

Briefly, in accordance with one aspect of the invention, a coded signal, such as a selected segment of a random noise signal, is transmitted and received with signal correlation techniques being employed at the receiving station to determine the identity and position of the radio transmitter. Through the transmission of a secondary signal which is displaced in time with respect to the coded signal, additional intelligence may be transmitted representing such desired information as the altitude of an aircraft.

In accordance with one exemplary arrangement of the invention, a radio transmitter is carried by a vehicular object, such as an airplane, with a signal source being adapted to repetitively transmit a coded signal. At a receiving station, the coded signal is applied to a signal correlator which also receives a signal from a local source which is coded to represent a particular known transmitting station. By establishing a condition of timing coincidence between the two signals applied to the correlator, an output signal is provided which indicates that the unknown vehicular object represents the object corresponding to the coded signal at the receiving station where the degree of correlation achieves a predetermined magnitude.

By means of a plurality of separate receiving stations, signals from a transmitter may be received and through a process of signal correlation, both the identity and position of the transmission station relative to the receiving station may be ascertained. Furthermore, additional information may be communicated to the receiving stations by transmitting repetitively two separate signals which are displaced in time by an amount determined by the information to be communicated. This additional information may, for example, relate to the altitude of the aircraft carrying the transmitter.

A better understanding of the invention may be had from a reading of the following detailed description and an inspection of the drawings, in which:

FIG. 3 is a diagrammatic illustration of a system for identifying and determining the position of a radio signal transmitting station;

FIG. 4 is a diagrammatic illustration of a signal transmitting station adapted to transmit both coded identification signals and auxiliary signals which are displaced in time with respect to the identification signals to represent intelligence;

FIG. 5 is a diagrammatic illustration of a system for the identification and position location of a radio transmitting station and including means for deriving intelligence from received signals which are displaced in time with respect to one another;

Figure 6A:
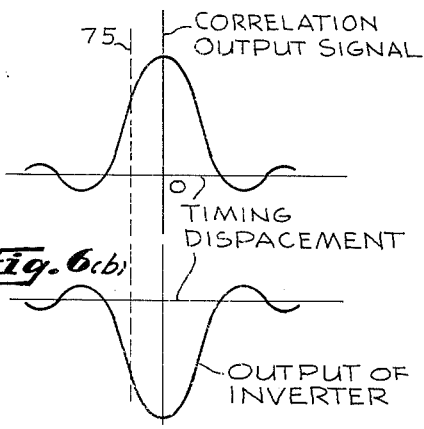
FIG. 6(a) is a graphical illustration of the magnitude of the output signal from the drum speed correlator of FIG. 5 plotted as a function of the time displacement of the signals applied thereto.
Figure 6B:
Figure 7:
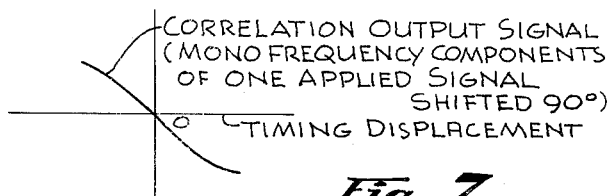

FIG. 6(b) is a graphical illustration of the magnitude of the inverted output signal from the drum speed correlator of FIG. 5 plotted as a function of the time displacement between signals applied thereto; and FIG. 7 is a graphical illustration of the magnitude of the output signal from a signal correlator plotted as a function of the time displacement between the signals applied thereto where the monofrequency signal components of one of the signals are shifted by 90°.

Figure 1:
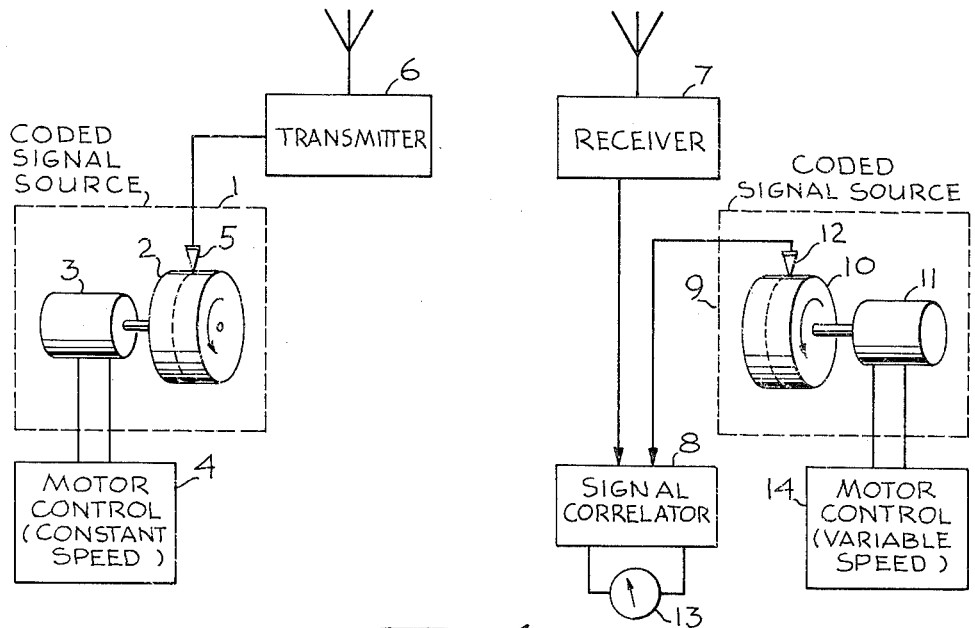
FIG. 1 is a diagrammatic illustration of a system for identifying a radio signal transmitting station.

Referring to the drawings in detail, there is shown in FIG. 1 a simplified representation of a system in accordance with the invention for determining the identity of a radio signal transmitting station through the use of signal correlation techniques. In the arrangement of FIG. 1, coded signals corresponding to the identity of the transmitting station are provided by a coded signal source 1 which may include, for example, a cyclic recording medium such as a magnetic drum 2 which is driven by a motor 3. The motor 3 is connected to a motor control circuit 4 which energizes the motor to rotate at a substantially constant speed.

The magnetic drum 2 bears a suitable coded recording corresponding to the identity of the radio transmitting station. Although various types of coded signals may be employed, in accordance with a preferred form of the present invention, the signal recorded on the drum 2 comprises a segment or discrete sample of a signal derived from a random noise source. In this connotation, the term "coded" will be understood to mean "unique," since two samples (taken at different times) of a random noise signal are uniquely different from one another. Many suitable sources of random noise are well known, perhaps the simplest of which is the signal which may be obtained by high gain amplification of the random signal appearing across an ordinary resistor.

The motor 3 functions to turn the magnetic drum 2 with a magnetic reproducing head 5 being adapted to provide an electrical signal representing the coded signal recorded on the surface of the drum 2. As the drum 2 rotates, the coded signal is repetitively reproduced by the head 5 from which the signal is applied to a radio transmitter 6.

In a complete identification system in accordance with the invention for use in air traffic control, for example, it is contemplated that each airborne vehicle will contain means for developing a coded signal which is applied to a radio transmitter for repetitively transmitting a signal which uniquely represents one particular airborne vehicle. It will be appreciated that where the coded signals are derived from segments of a random noise signal, a substantially infinite number of separate coded signals uniquely different from one another may be obtained. Furthermore, even though a segment of a random noise signal which is limited in bandwidth by a signal transmission system is no longer completely random, the nature of the signal is sufficiently complex as to render the counterfeiting of the signal extremely difficult if not completely impossible from a practical standpoint.

With a great many radio transmitting stations repetitively transmitting coded identification signals on the same or closely related radio carrier frequencies, a great deal of difficulty might ordinarily be expected in the identification of any particular one of the signals being transmitted. However, in accordance with the present invention, an identification of any given one of the coded signals, and hence an identification of the particular radio transmitting station transmitting such signal, is made possible through the use of signal correlation techniques at a receiving station.

At the receiving station shown in FIG. 1, a conventional radio signal receiver 7 is provided which is adapted to receive radio signals transmitted by the transmitter 6, as well as radio signals transmitted by other transmitters with each of the transmitted signals uniquely representing a particular one of the radio signal transmitting stations by virtue of there being located at each transmitting station a uniquely coded source of signals.

It will be appreciated that the transmitter 6 and the receiver 7 may include conventional modulating and demodulating arrangements for converting the coded signals to an appropriate modulated wave for radio transmission and for deriving from the transmitted signal at the receiver a signal corresponding to the signal provided by the coded signal source at the transmitter. Accordingly, at the output of the receiver 7, there appears a signal corresponding to the signal provided by the coded signal source 1 at the transmitter. However, where a number of separate radio transmitting stations are operating on a common frequency, there will also appear at the output of the receiver 7, along with the coded signals corresponding to the particular radio transmitting station shown in FIG. 1, signals corresponding to other signal transmitting stations, as well as whatever spurious signals may be introduced due to atmospheric effects or the like.

For the purpose of identifying a particular transmitting station, in accordance with the form of the invention shown in FIG. 1, the signal from the receiver 7 at the receiving station is applied to a signal correlator 8 which conventionally includes a signal multiplying arrangement. At the receiving station, there is located a second coded signal source 9 which repetitively provides a coded signal corresponding to the identity of one particular radio transmitting station. For example, in an air traffic control system, duplicate recordings of a suitable coded signal such as a segment of random noise may be made prior to the departure of an aircraft on a particular journey with one recording being placed in the aircraft coded signal source and the other recordings being placed at receiving stations.

The coded signal source of the receiving station of FIG. 1 may include a cyclic storage medium such as a rotating magnetic drum 10 which is driven by a motor 11 so that a pickup means such as a magnetic reproducing head 12 provides an output signal corresponding to the coded signal recorded on the drum 10. The output signal from the coded signal source 9 is applied to the signal correlator 8 for correlation with the signal from the receiver 7. By means of an output indicator 13 connected to the signal correlator 8, the degree of correlation between the signals applied to the signal correlator 8 may be determined. In order to achieve a maximum indication on the indicator 13, the signals applied to the signal correlator 8 must contain mutually coherent frequency components which appear at the same time with respect to one another. That is, a maximum output signal at the indicator 13 will be achieved where the signals from the coded signal source 1 and the coded signal source 9 are substantial duplicates of one another and the two signals are applied to signal correlator 8 in coincident time relationship.

The timing relationship between the two signals, in the arrangement of FIG. 1, may be adjusted by means of a variable speed motor control circuit 14 connected to the motor 11. By either a manual or automatic adjustment of the motor control circuit 14, the drum 10 may be brought into synchronism with the drum 2 at the transmitting station and the relative timing displacement of the signals applied to the signal correlator 8 may be adjusted so as to establish a timing relationship providing a maximum correlation indication on the indicator 13. Even though the output signal from the receiver 7 includes many other signal components in addition to the particular coded signals to be identified, the arrangement of FIG. 1 is capable of achieving a positive identification of the coded signal due to the use of signal correlation techniques.

The signal correlator 8 conventionally includes not only a signal multiplying circuit but also an integrating circuit or low pass filter which time averages the product signal over an interval in time so that the maximum indication 13 may be based on a sequence of repetitive cycles of the applied signals. Such an arrangement further enhances the ability of the system to recognize and identify particular coded signals in the presence of extraneous and spurious signals which appear along with the coded signal to be identified. Where the output signal from the receiver 7 does not include a coded signal corresponding to that recorded at the receiving location on the drum 10, the indicator 13 does not provide an indication of maximum correlation and, as a result, the system of FIG. 1 functions to provide a positive identification of a particular coded signal source when and only when such coded signal source is within the range of the receiver 7.

Although the simplified arrangement of FIG. 1 is capable of identifying a single radio transmission station corresponding to the coded signals on the receiving station drum 10, in a more complex system, the output signal from the receiver 7 may, in accordance with the present invention, be applied to any desired number of signal correlation circuits which individually received separate coded signals each representing a particular radio transmitting station. By such an arrangement, the present invention provides means for identifying any number of radio transmitting stations whose signals are within the range of the receiver 7.

Figure 2:
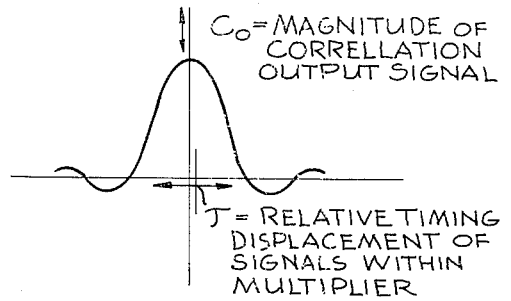
FIG. 2 is a graphical illustration of the magnitude of an output signal from a signal correlator as a function of the timing relationship between the signals applied to the signal correlator.

The manner in which the output signal from the signal correlator 8 of FIG. 1 varies with the relative timing between the signals applied thereto may be seen from the graphical illustration of FIG. 2. As the value of the relative timing between the two signals reaching the signal multiplier 8 is changed over a range of values, the magnitude of the correlation output signal, as measured and indicated by the indicator 13, varies as shown in FIG. 2. If the magnitude of the relative timing displacement actually existing between the two signals as they reach and are together multiplied in the correlator 8 is assigned the symbol $\tau$, and the magnitude of the correlation output signal is assigned the symbol $C_o$, a plot of the values of the magnitude $C_o$ versus the values of magnitude $\tau$ typically take the form shown in FIG. 2. From FIG. 2 it is seen that the absolute value of the correlation output signal magnitude is maximum for value of relative timing displacement $\tau=0$. This value $\tau=0$ corresponds to the event of co-extensive time coincidence or "complete" correlation between mutually coherent components of the respective signals as they reach the correlator 8. Since this maximum value is achieved only where the signals contain mutually coherent components and are presented to the signal correlator 8 in the proper time relationship, a maximum indication by the meter 13 of FIG. 1, along with knowledge of the identity of the station transmitting a signal corresponding to that recorded on drum 10, provides a positive identification of the signal transmitting station from which the coded signals are transmitted.

Although a system described above in connection with FIG. 1 may be used for the purpose of identifying a particular radio transmitting station, in accordance with another aspect of the invention not only the identity but the position of a particular radio transmitting station may be ascertained through the use of coded signals which are processed by signal correlation techniques. One such arrangement is illustrated in FIG. 3 in which a radio transmitting station 20 has, as a part thereof, means for generating a coded signal comprising in a preferred arrangement a segment of a random noise signal which is repetitively transmitted as described above. Signals from the radio transmitting station 20 are received in the arrangement of FIG. 3 by three separate receiving stations 21, 22 and 23 forming the apices of a triangle. The "C" receiver 23 may be located at a central receiving station at which the signals received by the "A" and "B" receivers, 21 and 22, are relayed by suitable radio or wire communication systems as desired. Accordingly, a relay receiver 24 provides an output signal corresponding to signals received by the "A" receiver 21 and a relay receiver 25 provides an output signal corresponding to signals received by the "B" receiver 22. In order to compensate for any time delays introduced by the relay apparatus, suitable signal delaying means may be included in one or more of the signal channels, so that at the central receiving station three separate electrical signals are provided bearing the same relative timing relationship as the signals arriving at each of the three receivers 21, 22 and 23. Where the "A" and "B" relay apparatus each introduce the same time delay, a single delaying means 26 may be connected to the output of the "C" receiver 23 as shown in FIG. 3.

Although direction finding systems are known in which the signals received from three separate transmitters are compared to determine their relative time delays so as to determine the position of an object from which signals are transmitted, known arrangements rely for their operation upon a comparison of the transmitted signals themselves so that where a single transmission frequency is shared by a number of separate radio transmitters, it is difficult if not impossible to achieve an accurate determination of the position of any particular transmitter. In contrast, in the arrangement of FIG. 3, an identification of a particular radio transmitter is provided through signal correlation techniques similar to those described above in connection with FIG. 1 and the position of the identified radio transmitting station is determined through a comparison of the received signals with a locally generated coded signal corresponding to that of a particular radio transmitting station. Accordingly, in FIG. 3 the time corrected signal from the delay circuit 26 is applied to a correlator 27 which may include a signal multiplying circuit and an integrating or smoothing circuit as described above in connection with FIG. 1.

The central receiving station of FIG. 3 includes a coded signal source 28 which may, as shown, comprise a magnetic drum 29 linked to a motor 30. By means of the pickup head 31, coded signals are derived from the drum 29 which correspond in identity to a particular radio transmitting station, as for example, the transmitting station 20. The "C" correlator 27 provides an output signal corresponding to the degree of correlation between the signals from the coded signal source 28 and the received signals from the transmission station 20, as shown in FIG. 2. In order to achieve a maximum output signal from the correlator 27, the coded signal source 28 must be brought into the proper time relationship with respect to the received signals and for this purpose a drum control servo system 32 is connected to receive signals from the delay device 26 at the coded signal source 28. In response to a comparison of the signals applied thereto, the drum control servo system functions to energize the motor 30 to bring the drum 29 into substantial synchronism with the received signals, both with respect to repetition rate and timing displacement. The arrangement thus far described forms a closed loop servo system in which the rotation of the drum 29 is established at a predetermined speed and timing relationship with respect to the received signals arbitrary but applied to the "C" correlator 27. As a result, there is provided at the pickup head 31 on output signal which substantially duplicates the coded signal component of the signal appearing at the output of the delay device 26 but which is not contaminated with any extraneous or spurious signals. Once the drum 29 is brought into synchronism, the transmission station 20 is identified as being that represented by the coded signal on the drum 29. Where an indication of the identification is desired, a suitable indicator 33 may be connected to the "C" correlator 27 to identify the condition where a maximum correlator output signal appears.

In addition to the identification of a particular transmission station 20, the arrangement of FIG. 3 is capable of providing an indication of the position of the transmitting station 20 with respect to the "A," "B" and "C" receivers 21, 22 and 23. For this purpose, the signal from the "A" relay receiver 24 at the central receiving station is applied to an "A" correlator 34 which again may comprise a suitable signal multiplying circuit along with an integrating or smoothing filter. Also applied to the "A" correlator 34 is a signal derived from the coded signal source 28 via the variable time delay device 35. The variable time delay device 35 may comprise either an electrical circuit or electromechanical means for delaying the signal from the coded signal source 28 by a suitable interval to establish a maximum indication on an indicator 36 connected to the "A" correlator 34. The adjustment of the variable time delay 35 may take place either automatically under the control of a servo system which senses the output of the "A" correlator 34 or, in the alternative, as shown in FIG. 3, a manual means 37 for adjusting the amount of time delay introduced by the variable time delay 35 may be used if desired. By means of a suitable pointer 38 and scale 39 or the like, an indication of the amount of delay required to establish a maximum correlation function at the output of the "A" correlator 34 may be measured.

In operation, where the transmitting signal source 20 is equidistant from the "A" receiver 21 and the "C" receiver 23, a maximum signal is provided by the correlator 34 where the variable time delay 35 is set to 0. However, where the transmitting station 20 is not equidistant from the "A" and "C" receivers, 21 and 22, an adjustment must be made in the variable time delay 35 to establish a condition of maximum signal from the correlator 34 with the relative time delay introduced by the variable time delay device 35 being substantially equal to the difference between the times of arrival of the signals at the "A" receiver 21 and the "C" receiver 23 from the transmitting station 20. Therefore, the setting of the variable time delay 35 provides position information which may be used to determine one coordinate of the actual position of the transmitting station 20.

With two receiving stations, the position of the transmitting sation is determined to be along a particular hyperbolic line of position so that in order to define the precise location of the transmitting station, additional information is required. For this purpose, in FIG. 3, the signal from the "B" receiver 22 appearing at the output of the relay receiver 25 is applied to a "B" correlator 40 which also receives a signal from the receiving station coded signal source via a variable time delay device 41. The "B" correlator 40 at the variable time delay device 41 may be identical in character to the "A" correlator at variable time delay 35 described above. Thus, upon adjustment of a mechanical means 42, an amount of relative time delay may be introduced between the signals applied to the "B" correlator 40 to establish a maximum signal at an indicator 43. Therefore, the position of a pointer 44 on a scale 45 indicates the difference in the arrival times of the signals from the transmitting station 20 at the "B" receiver 22 and the "C" receiver 23. The result is that a second hyperbolic line of position is determined which intersects the first line of position thereby defining the location of the transmitting station 20 with respect to the receivers A, B and C indicated at 21, 22 and 23.

By means of the arrangement of FIG. 3, both the identity and position of a radio transmitting station 20 may be determined. Accordingly, the system is suitable for use in the control of air traffic where relatively large numbers of airborne radio transmitting stations each transmit unique coded signals which are identified at a central receiving station through a process of signal correlation with the position of each identified airborne transmitter being established through a measurement of the relative times of arrival of the transmitted signals at three separate receiving stations. In view of the fact that the locally generated coded signal from the source 28 is employed in the measurement of the relative timing, a substantial improvement in the signal-to-noise ratio of the system is attained inasmuch as the locally generated signal is a "clean" signal uncontaminated by extraneous and spurious signal components.

In addition to the identification and position locating functions of the present invention described above, there may also be provided in an arrangement in accordance with the invention means for transmitting intelligence from a radio transmitter to a receiving station. Such a means is desirable inasmuch as for a complete aircraft traffic control system it is essential to be able to determine not only the identity and position of a particular airborne vehicle but also the altitude of each identified vehicle. For this purpose, a transmission station as shown in FIG. 4 may be employed in which a secondary signal is transmitted along with a coded noise signal with the relative timing displacement between the two transmitted signals representing the intelligence to be transmitted such as the altitude of the transmitter.

The arrangement of FIG. 4 includes a coded noise source 50 which may, for example, comprise a cyclic recording medium in the form of a magnetic drum 51 driven by a motor 52 whose speed is maintained at a relatively constant value by means of a motor control circuit 53. The drum 51 bears on a first track a primary coded signal uniquely identifying the transmitting station. As noted above, in a preferred arrangement of the invention, the signal $T_1$ may comprise a segment of random noise with a pickup head 54 being associated with the drum 51 for deriving an electrical signal corresponding to the coded representation $T_1$. The pickup head 54 is held in fixed relationship with respect to the drum 51 by means of a suitable support indicated diagrammatically in FIG. 4 by the dashed line 55.

In addition to the track $T_1$, the drum 51 has recorded thereon a second track bearing a secondary coded signal $T_2$ which may also be a segment of random noise if desired. When the drum 51 is prepared, the tracks $T_1$ and $T_2$ are recorded thereon with a predetermined timing relationship. However, for the purpose of transmitting intelligence, the pickup head 56 associated with the track $T_2$ is arranged to be subject to displacement along the track $T_2$ so as to vary the relative timing displacement between the two signals reproduced by the pickup heads 54 and 56 depending upon the amount by which the pickup head 56 is displaced. Of course, it will be appreciated that the pickup head 54 may be moved in its position while the pickup head 56 is held in fixed position if desired, the important thing being that the relative timing displacement between the electrical signals provided by the pickup heads 54 and 56 is made controllable by changing the positions of these pickup heads with respect to the tracks $T_1$ and $T_2$ of the drum 51. As shown in the specific embodiment illustrated in FIG. 4, the pickup head 56 associated with the track $T_2$ is linked to a suitable altitude measuring device such as an aneroid or other barometric pressure sensitive device 57. The linkage between the head 56 and the altitude sensing device 57 is represented diagrammatically in FIG. 4 by means of a dashed line 58.

In operation, the altitude measuring device 57 responds to changes in barometric pressure so as to displace the pickup head 56 with respect to the pickup head 54 in accordance with the altitude of the transmitting station. Where the transmitting station is carried by an airborne vehicle, the barometric pressure acting upon the device 57 corresponds to the altitude of the station and hence the position of the head 56 likewise corresponds to the altitude of the station with the result that the timing of the two electrical signals, supplied by the heads 54 and 56, with respect to one another, is changed as a function of the altitude of the station. The separate electrical signals from the heads 54 and 56 may be combined and applied to an amplifier 59 from which the combined signal is applied to a conventional transmitter 60. The result is that there is transmitted by the station of FIG. 4 a signal which has a first component corresponding to the track $T_1$ uniquely representing the identity of the station and a second component corresponding to the track $T_2$ which is displaced in time with respect to the signal corresponding to the track $T_1$ in accordance with the altitude of the station.

At a receiving station, the identity of the transmitting station may be determined through the use of signal correlation techniques as described above in connection with FIGS. 1 and 3, the position of the transmitter with respect to a receiving station may be determined by means of the position finding techniques described above in connection with FIG. 3, and by means of an additional signal correlation arrangement, the timing relationship between the signal components corresponding to the tracks $T_1$ and $T_2$ may be ascertained so that not only the identity and position of the station may be determined but also the altitude.

One suitable receiving station for accomplishing the aforementioned three separate functions of identification, position determining and altitude transmission is shown in FIG. 5. In addition, in the arrangement of FIG. 5, there is shown one particular suitable arrangement for controlling a coded signal source at a receiver to bring the coded signals provided thereby into a predetermined relationship with respect to those received from a transmitter.

The arrangement of FIG. 5 includes three separate receivers 61, 62 and 63 which correspond to the receivers "A," "B" and "C" of FIG. 3 and which may be arranged at the apices of a triangle to receive signals transmitted by a transmitting station falling within the ranges of the three receivers. In order to transmit the received signals to a central processing station, suitable communication relay links may be employed as indicated in FIG. 3 with it being understood that each of the signals from the receivers 61, 62 and 63 is provided either without any delay being produced by the relaying of the signals or in the alternative with a suitable delay device being included in one or more of the channels to bring the signals into the proper relationship corresponding to the times at which the signals are received by each of the three receivers.

In the arrangement of FIG. 5, a coded signal source is provided by a rotating drum 64 having a plurality of separate record tracks. In order to bring the drum 64 into a predetermined timing relationship with respect to signals received by the receiver 63, a signal correlation process is employed in which a coded signal corresponding to the identity of a particular transmitter is derived from a first one of the tracks of the drum 64 referred to as $T_{1D}$. The signal on the track $T_{1D}$ is identical with a signal recorded on a track $T_1$ of the drum 64 except that either through a displacement of the pickup head 65 associated with the track $T_{1D}$ or through an actual displacement of the track $T_{1D}$ relative to the track $T_1$, an electrical signal is provided by the pickup head 65 which is delayed by a predetermined interval in time with respect to the signal derived from the $T_1$ track by a pickup head 66. The delayed signal from the pickup head 65 is amplified by means of an amplifier 65a and applied to a drum speed correlation circuit 67 which may comprise a signal multiplier and integrating circuit. In addition, the correlation circuit 67 receives a signal from the receiver 63 so as to provide an output signal corresponding to the delayed signal from the track $T_{1D}$ and the signal received by the "C" receiver 63. The output signal from the correlation circuit 67 is reversed in polarity by an inverter 68A and applied to a servo amplifier 68B which, in turn, controls a motor 69 which functions to turn the drum 64. Accordingly, there is established a servo loop which responds to the signal from the output of the correlation circuit 67 to control the rotation of the drum 64.

In the operation of the arrangement of FIG. 5, the motor 69 may be arranged to turn the drum 64 at a free-running rotational speed which produces a repetition of the recorded signals at a rate slightly higher than the repetition rate of the received signals. Therefore, the signals applied to the correlator 67 bear a varying relative timing displacement with each successive revolution of the drum 64. As the relative timing displacement decreases, the output signal from the drum speed correlator 67 rises along the left hand slope of the curve of FIG. 6(a) and the inverter 68A provides an output signal as shown in FIG. 6(b) which may be applied to the motor 69 to reduce its speed. As the speed of the motor 69 is reduced, a condition of synchronism between the two signals applied to the drum speed correlator 67 is approached at which point the servo loop becomes balanced to control the speed of the drum 64 to maintain the signals applied to the drum speed correlator 67 at the same repetition rate. In FIGS. 6(a) and 6(b) the dashed line 75 defines a balanced condition of the servo loop which is determined by the gain and response characteristics of the servo loop components such as a servo amplifier. The operation of the circuit may best be understood by considering the following examples:

(1) Assuming that the drum 64 tends to speed up from a condition of synchronism, the relative timing displacement between the two signals applied to the drum speed correlator 67 will change in a direction to produce an output signal from the correlator having a magnitude falling along the curve of FIG. 6(a) to the right of the dashed line 75. Corresponding output signals from the inverter 68A will decrease from the balanced condition therefor which, in turn, produces a decrease in the signal applied to the motor 69 from the servo amplifier 68 so as to slow down the motor 69 whereby the drum 64 is brought back into a condition of synchronism at the operating point defined by the dashed line 75.

(2) On the other hand, assuming that the drum 64 has a tendency to slow down, the relative timing displacement between the signals applied to the correlator 67 will be such that the magnitude of the output signals from the correlator will have a value to the left of the dashed line 75 of FIG. 6(a). The corresponding output signals from the inverter shown in FIG. 6(b) has an increased value with the result that a larger signal is applied to the motor 69 which functions to increase the speed of the drum 64 thereby bringing the drum back into synchronism at the point of operation defined by the dashed line 75 in FIG. 6(a) and FIG. 6(b).

In addition to establishing a condition of synchronism of the drum 64 with respect to the rate of repetition of the received signals, it is also necessary to establish a synchronized time relationship with respect to the received signals. Accordingly, the drum 64 must not only be driven at the proper speed, but the signal from the pickup head 66 must also bear a coincident timing relationship with respect to the signals from the "C" receiver 63. For this purpose, the head 66 as well as the head 85 are linked to a movable mechanical element which provides for positioning of the head 66 along the track $T_1$ and a positioning of the head 85 along the track $T_2$. It will be appreciated that where the drum 64 is rotating at a speed which provides for a repetition rate of the recorded signals equal to the repetition rate of the received signals, the relative phases or timing relationships between the signals may be adjusted by a positioning of the pickup heads relative to the tracks. Accordingly, the position of the mechanical movement bearing the head 66 may be determined by a servo loop in which the signal derived from the head 66 is amplified by the amplifier 72, differentiated by the differentiating circuit 71 and applied to the "C" correlator 70. The differentiating circuit 71 functions to produce a 90° phase shift of all the monofrequency components appearing in the signal provided by the pickup head 66. In the case where signals are applied to a correlator with one of the signals constituting a derivative of the signal by virtue of its monofrequency components being shifted in phase by 90°, the output signal from the correlator as a function of the relative timing displacement between the applied signals follows the configuration of FIG. 7. From FIG. 7, it may be seen that at a relative timing displacement equal to zero, a zero output signal is provided, while a deviation from a zero relative timing displacement produces positive and negative output signals having a magnitude corresponding to the amount of relative timing displacement. The output signal from the "C" correlator 70 may be applied to a servo mechanical link 95 which functions to position the pickup heads 66 and 85 to maintain a condition of substantially zero relative timing displacement between the signals applied to the "C" correlator 70. Thus, the servo mechanical link 95 functions to establish a balanced servo condition at the point at which the curve of FIG. 7 passes through zero with any deviation from such substantially zero relative timing displacement producing an output signal from the "C" correlator 70 which functions to cause the servo mechanical link 95 to reposition the heads 66 and 85 to bring the output signal from the "C" correlator 70 back to zero.

With the above-described arrangement for controlling the rotation of the drum 64 so that the signal reproduced by pickup head 66 is in time coincident relationship with the signal delivered by receiver 63, there is provided at a ground station a reference source of coded signals for comparison with the signals received by each of the receivers 61, 62 and 63 so that the identity and position of an unknown source of signals may be determined. Furthermore, where the radio transmitting station transmits additional intelligence as described above in connection with FIG. 4, the additional intelligence information may be derived.

For the purpose of position determination, the signal from the track $T_1$ may be rerecorded on two auxiliary tracks $T_A$ and $T_B$ which form a part of the variable delay device. Each of the tracks $T_A$ and $T_B$ may have associated therewith suitable signal energy means so that signals may be continuously recorded thereon although such means are omitted on the drawing for convenience of illustration. As shown in FIG. 5, the output of the amplifier 72 is connected to two separate recording heads 73 and 74 associated with the tracks $T_A$ and $T_B$.

There is then derived from the tracks $T_A$ and $T_B$ by means of movable playback heads 75 and 76 electrical signals which bear a time relationship with respect to the signal from the $T_1$ track pickup head 66 determined by the position of the heads 75 and 76 relative to the tracks $T_A$ and $T_B$. The signal from the pickup head 75 is amplified by an amplifier 77A, shifted in phase by the differentiating circuit 77B, and then applied to a signal correlator 77C which may, as described above, include a signal multipler connected to an integrating circuit. The correlator 77C also receives the signal from the "A" receiver 61 and functions to provide an output signal corresponding to a correlation of the two separate signals applied thereto. Since the signal applied to the correlator 77C is the derivative of the signal from the $T_1$ pickup head 66, and hence the signal transmitted by the radio transmitting station, the correlator 77C functions to provide an output signal having the characteristic shown in FIG. 7. Therefore, where the signals applied to the correlator 77C have mutually coherent signal components appearing coincident in time, a zero output signal is provided with positive or negative output signals being provided in accordance with a deviation from the coincident timing relationship. The signals from the correlator 77C are, therefore, suitable for use in a servo system to control the position of the pickup head 75 to maintain a coincident timing relationship and, for this purpose, the output signal from the correlator 77C may be applied to a servo mechanical link 78 which is connected to a suitable mechanical linkage indicated diagrammatically in FIG. 5 by the dashed line 79. The mechanical linkage 79 is coupled to the pickup head 75 and responds to the error signals provided by the correlator 77C so as to preserve and maintain the coincident timing relationship. Since the position of the mechanical linkage 79 represents the position of the pickup head 75 and since the position of the pickup head 75 corresponds to the amount of time delay required to establish the proper correlation between the signals, the position of the mechanical linkage 79 also represents the time delay of the signal received by the "A" receiver 61 as compared to the signal received by the "C" receiver 63. Accordingly, a suitable position indicator 80 may be connected to the mechanical linkage 79 as shown in FIG. 5 for the purpose of registering the time delay and hence the line of position passing through the radio transmitting station in accordance with the principles discussed above in connection with FIG. 3.

In a similar fashion, the signals recorded on the track $T_B$ may be applied to a correlation circuit 81C after being amplified by an amplifier 81A and shifted in phase by a differentiating circuit 81B. Also applied to the "B" correlator circuit are signals received by the "B" receiver 62. Again, the correlation circuit provides a suitable output signal as shown in FIG. 7 for application to a servo mechanical link 82, which, in turn, drives the mechanical linkage indicated diagrammatically in FIG. 5 by the dashed line 83, which in turn controls the position of the pickup head 76 to maintain the coincident timing relationship. Again, a suitable position indicator 84 may be connected to the mechanical linkage 83 to provide an output indication of the time delay required to maintain a coincident relationship between the signals applied to the "B" correlator 81 and hence another line of position of a radio transmitting station defined by the signals received by the "B" and "C" receivers 62 and 63. As in FIG. 3, the result is that two intersecting lines of position are established from which the location of the radio transmitting station may be determined.

The arrangement of FIG. 5 also includes means for deriving additional intelligence information from signals transmitted by the arrangement shown in FIG. 4. For this purpose there is included on the drum 64 a track $T_2$ bearing a signal substantially identical to the secondary signal carried by the radio transmitting station. By means of pickup head 85 an electrical signal is provided corresponding to the track $T_2$ on the drum 64. By mechanically connecting the head 85 with the $T_1$ track pickup head 66, both heads are positioned to establish the correct phase relationship with the signals received by the "C" receiver 63. The derived electrical signal may be amplified by amplifier 86 and recorded on an auxiliary track $T_C$ of the drum 64 by means of a recording head 88. By means of a movable pickup head 89, the signals recorded on the track $T_C$ may be derived with a variable time delay being introduced in accordance with the position of the pickup head 89. The signals from the pickup head 89 are applied to a differentiating circuit 87 and thence to an altitude correlator 90 which may include a signal multiplier connected to an averaging or smoothing circuit as in the case of the other correlators described above. The altitude correlator 90 also receives a signal from the "C" receiver 63. As noted previously, the timing displacement between two transmitted signals may be varied in accordance with intelligence such as the altitude of an aircraft. Where such signals are transmitted, there is applied to the altitude correlation circuit 90 of FIG. 5 not only a coded identification signal but a secondary signal which is delayed with respect to the coded signal by a predetermined interval. By making the signal on the track $T_2$ of the drum 64 at the receiving station correspond to the auxiliary signal in the particular radio transmitting station involved, and by introducing a variable time delay into the signal by means of the track $T_C$, the intelligence transmitted by the variable delay between the signals may be ascertained. For this purpose, the altitude correlator 90 is adapted to provide an output signal as shown in FIG. 7 by virtue of the fact that the applied signal is a derivative of the signal from the $T_2$ pickup head 85 of the drum 64. The output signal from the altitude correlator 90 may be applied to a servo mechanical link 91 which drives a mechanical linkage indicated diagrammatically in FIG. 5 by the dashed line 92. The mechanical linkage 92 is connected to the movable pickup head 89 associated with the track $T_C$ so that a servo loop is formed which maintains a coincident timing relationship between the signals applied to the altitude correlator 90. Since the position of the mechanical linkage 92 and the pickup head 89 represents the time delay required to establish a coincident timing relationship between the received secondary signal and the locally generated signal, the time delay between the coded identification signal and the secondary signal is also represented by the position of the pickup head 89 and the mechanical linkage 92. Accordingly, there may be connected to the mechanical linkage 92 an altitude indicator 93 for displaying altitude of the radio transmitting station.

Although the present invention has particular usefulness in an air traffic control system in which the identity and position of various airborne vehicles is to be determined, and in which auxiliary information such as altitude is to be transmitted, it will be appreciated that the invention is not limited thereto and may be readily adapted for use in any system in which signal identification, position determination, or intelligence transmission is to be provided either as separate functions or together. Therefore, the invention should be considered to include any and all modifications, variations and alternative arrangements falling within the scope of the annexed claims.

We claim:

1. In a system for determining the identity of an unknown vehicular object, the combination of a source of coded signals comprising a repeating segment of a random signal, a signal transmitting station coupled to the coded signal source, said coded signal source and said signal transmitting station being transported by said vehicular object, a signal receiving station for receiving signals transmitted by said signal transmitting station, a second coded signal source for providing repeating signals corresponding to the random signal segment provided by said first coded signal source, signal correlation means coupled to said receiver and said second coded signal source for effecting a signal correlation of the signals provided by said first coded signal source and the corresponding signals provided by said second coded signal source, and means coupled to said signal correlation means for sensing a condition of signal correlation between the signals from said first and second coded signal sources for determining the identity of said unknown vehicular object.

2. In a system for determining the identity of an unknown vehicular object, the combination of a first coded signal source for providing a repetitively occurring segment of a random signal representing the identity of said unknown vehicular object, a signal transmitter coupled to said first coded signal source, said first coded signal source and said signal transmitter being transported by said unknown vehicular object, a receiver for receiving signals transmitted by said signal transmitter, a second coded signal source for repetitively providing a segment of a random signal representing the identity of a particular signal transmitter, and signal correlation means coupled between said receiver and said second coded signal source for establishing a condition of signal correlation between the signals provided by said first coded signal source and the signals provided by said second coded signal source where the identity of said unknown vehicular object corresponds to the particular signal transmitter identified by the signals from said second coded signal source.

3. In a system for determining the identity of an unknown vehicular object the combination of a first repeating random signal source, a transmitter coupled to said first signal source, said first signal source and said transmitter being transported by said vehicular object, a receiving station for receiving signals from said transmitter, a second repeating random signal source for providing signals representing a known vehicular object, a signal multiplier coupled to said receiver and said second signal source for combining signals from said first and second signal sources in a process of signal correlation, and means coupled to said signal multiplier for establishing the identity of said unknown vehicular object as being the object represented by the signals provided by said second signal source when a condition of correlation between the signals applied to the signal multiplier occurs.

4. In a system for determining the identity of an unknown vehicular object the combination of a signal transmitting station transported by the vehicular object, said signal transmitting station including a source of repetitively occurring random signals corresponding to the identity of the unknown vehicular object, a receiving station for receiving signals from the transmitting station, said receiving station including a second signal source for provding repetitively occurring random signals corresponding to a particular object of known identity, signal correlation means responsive to signals from said first and second signal sources, said signal correlation means being adapted to identify said unknown vehicular object as being the known vehicular object represented by the signals from said second signal source upon the occurrence of a condition of signal correlation between the signals from said first and second signal sources, and means coupled to said second signal source for adjusting the repetition rate of the signals provided thereby so as to establish a predetermined relationship between the signals from said first and second signal sources applied to said signal correlation means whereby the signal correlation means establishes the identity of said unknown vehicular object as being the object represented by the signals from said second signal source by a process of signal correlation.

5. In a system for determining the identity of a signal transmitting station which repetitively transmits a segment of a random signal identifying the transmitting station, the combination of means for receiving signals transmitted by said signal transmitting station, a signal source for repetitively providing a segment of a random signal corresponding to the identity of a particular known signal transmitting station, signal correlation means coupled to said receiving means and to said signal source, said signal correlation means being adapted to provide an output signal corresponding to the degree of correlation between the signal from the signal transmitting station and the signal from said signal source, and means coupled to said signal source for controlling the rate of repetition of the signals provided thereby whereby said signal correlation means provides an output indication identifying said signal transmission as being the particular signal transmisson station represented by the signals from said receiving station signal source where said transmitting station and receiving station signals applied to said correlation means attain a predetermined condition of correlation.

6. In a system for determining the identity of an unknown vehicular object, the combination of a first source of random noise signals, a signal transmitting station coupled to the first random noise source, said first random noise source and said signal transmitting station being transported by said vehicular object, a signal receiving station for receiving signals transmitted by said signal transmitting station, a second random noise source for providing signals corresponding to the signals provided by said first random noise signal source, signal correlation means coupled to said receiver and said second random noise source for effecting a signal correlation of the signals provided by said first random noise source and the corresponding signals provided by said second random noise source and means coupled to said correlation means for sensing a condition of signal correlation between the signals from said first and second random noise sources for determining the identity of said unknown vehicular object.

7. In a system for determining the identity of an unknown vehicular object, the combination of a first signal source for providing a repetitively occurring segment of a random noise signal representing the identity of said unknown vehicular object, a signal transmitter coupled to said first signal source, said first signal source and said signal transmitter being transported by said unknown vehicular object, a receiver for receiving signals transmitted by said signal transmitter, a second signal source for repetitively providing facsimile representations of the random noise signals provided by said first signal source, and signal correlation means coupled between said receiver and said second signal source for establishing a condition of signal correlation between the signals provided by said first signal source and the facsimile representations thereof provided by said second signal source whereby the identity of said unknown vehicular object is determined.

8. In a system for determining the identity of an unknown vehicular object, the combination of a first repeating random noise signal source, a transmitter coupled to said first signal source, said first signal source and said transmitter being transported by said vehicular object, a receiving station for receiving signals from said transmitter, a second repeating random noise signal source for providing signals representing a known vehicular object, a signal multiplier coupled to said receiver and said second signal source for combining signals from said first and second signal sources by a process of signal correlation, and means coupled to said signal multiplier for establishing the identity of said unknown vehicular object as being the object represented by the signals provided by said second signal source when a condition of correlation between the signals applied to the signal multiplier occurs.

9. In a system for determining the identity of an unknown vehicular object, the combination of a signal transmitting station transported by the vehicular object, said signal transmitting station including a source of recorded random noise signals corresponding to the identity of the unknown vehicular object, a receiving station for receiving signals from the transmitting station, said receiving station including a second signal source for providing repetitively occurring recorded random noise signals corresponding to a particular object of known identity, signal correlation means responsive to signals from said first and second signal sources, said signal correlation means being adapted to identify said unknown vehicular object as being the known vehicular object represented by the signals from said second signal source upon the occurrence of a condition of signal correlation between the signals from said first and second signal sources, and means coupled to said second signal source for adjusting the repetition rate of the signals provided thereby so as to establish a predetermined relationship between the signals from said first and second signal sources applied to said signal correlation means whereby the signal correlation means establishes the identity of said unknown vehicular object as being the object represented by the signals from said second signal source by a process of signal correlation.

10. In a system for determining the identity of a signal transmitting sttaion which repetitively transmits a recorded signal comprising a segment of random noise identifying the transmitting station, the combination of means for receiving signals transmitted by said signal transmitting station, a signal source for repetitively providing signals comprising a segment of random noise corresponding to the identity of a particular known signal transmitting station, signal correlation means coupled to said receiving means and to said signal source, said signal correlation means being adapted to provide an output signal corresponding to the degree of correlation between the signal from the signal transmitting station and the signal from said signal source at said receiving station, and means coupled to said signal source for controlling the rate of repetition of the signals provided thereby whereby said signal correlation means provides an output indication identifying said signal transmission station as being the particular signal transmission station represented by the signals from said receiving station coded signal source where said transmitting station and receiving station signals applied to said correlation means attain a predetermined condition of correlation.

11. In a system for determining the identity of a signal transmitting station which repetitively transmits a segment of a random signal identifying the transmitting station, the combination of means for receiving signals transmitted by said signal transmitting station, a rotating record bearing a signal corresponding to the identity of a particular known signal transmitting station, signal reproduction means associated with said rotating record for deriving an electrical signal corresponding thereto, signal correlation means coupled to said receiving means and to said signal reproduction means, said signal correlation means being adapted to provide an output signal corresponding to the degree of correlation between a signal from the signal transmitting station and a signal from said rotating record medium, and means linked to said rotating record medium for controlling the rate of repetition of the signals provided thereby, whereby said signal correlation means provides an output indication identifying said signal transmission station as being the particular signal transmission station represented by the signals from said rotating record medium where said transmitting station and record medium signals applied to said correlation means attain a predetermined condition of correlation.

12. In a system for determining the identity of a signal transmitting station which repetitively transmits a segment of a random signal identifying the transmitting station, the combination of means for receiving signals transmitted by said signal transmitting station, a rotating storage medium bearing a random signal segment corresponding to the identity of a particular known signal transmitting station, signal reproduction means associated with said rotating storage medium for deriving an electrical signal corresponding to the signals thereon, signal correlation means coupled to said receiving means and to said signal reproduction means, said signal correlation means being adapted to provide an output signal corresponding to the degree of correlation between the signal from the signal transmitting station and the signal from said rotating storage medium, means responsive to a signal received from said transmitting station and linked to said rotating storage medium for establishing a condition of synchronism between the signals provided by said signal reproducing means, and the signals received from said signal transmitting station, whereby said signal correlation means provides an output indication identifying said signal transmission station as being the particular signal transmission station represented by the signals from said rotating storage medium in response to a predetermined condition of correlation between the signals applied thereto.

13. In a system for determining the identity of an unknown vehicular object, the combination of a signal transmitting station transported by the vehicular object, said signal transmitting station including a source of repetitively occurring random signals corresponding to the identity of the unknown vehicular object, a receiving station for receiving signals from the transmitting station, said receiving station including a rotating record medium bearing coded signals corresponding to the random signals transmitted by a particular signal transmitting station of known identity, signal reproduction means associated with said rotating record medium for providing an electrical signal corresponding to the signal thereon, signal correlation means responsive to signals from said transmitting station and from said reproduction means, said signal correlation means being adapted to identify said unknown vehicular object as being the known vehicular object represented by the signals from said rotating record medium upon the occurrence of a condition of signal correlation between the signals applied thereto, and means linked to the rotating record medium for adjusting the repetition of the signals provided thereby so as to bring the signals applied to said signal correlation means into a predetermined synchronized relationship, whereby the signal correlation means indicates the degree of correlation between the signals from the signal transmitting station and the signals on said rotating record medium.

14. In a system for transmitting intelligence from a vehicular object to a receiving station, the combination of a source of coded signals, a signal transmitting station coupled to the coded signal source, said coded signal source and said signal transmitting station being transported by said vehicular object, said signal transmitting station including means for transmitting coded signals from said source along with an additional secondary signal which is delayed with respect to the signal from said source by a time interval corresponding to intelligence to be transmitted, a signal receiving station for receiving signals transmitted by said signal transmitting station, a second coded signal source for providing a signal corresponding to the signals provided by said first coded signal source, means coupled to said second coded signal source for establishing a predetermined condition of synchronization between the signals from said first and second coded signal sources, and said signal receiving station also including means for determining the delay of said auxiliary signal with respect to the signal from said first coded signal source by a process of signal correlation to provide an output signal representing the intelligence being transmitted by said signal transmitting station.

15. In a system for determining the identity and altitude of an unknown vehicular object, the combination of a signal transmitting station transported by the vehicular object, said signal transmitting station including means for transmitting two repetitively occurring signals, one of which corresponds to the identity of the unknown vehicular object and the relative timing between which two repetitively occurring signals correspond to the altitude of the vehicular object, a receiving station for receiving signals from the transmitting station, said receiving station including means for providing repetitively occurring signals corresponding to a particular object of known identity, signal correlation means responsive to signals from said transmitting and receiving station, said signal correlation means being adapted to identify said unknown vehicular object as being the known vehicular object represented by the receiving station signals upon the occurrence of a condition of signal correlation between the signals from said transmitting and receiving stations, and means coupled to said signal correlation means for providing an output signal corresponding to the relative timing of the signals transmitted by the signal transmitting station, whereby the altitude of said unknown vehicular object is determined.

16. In a system for determining the identity of an unknown vehicular object, the combination of a signal transmitting station transported by the vehicular object, said signal transmitting station including a rotating storage medium bearing at least one coded signal comprising a random signal segment corresponding to the identity of the vehicular object, a receiving station for receiving signals from the transmitting station, said receiving station including a second rotating storage medium bearing coded signals corresponding to a particular object of known identity, first means coupled to said receiving station and to said second rotating storage medium for developing a signal corresponding to the degree of correlation between the signals from said first and second rotating storage mediums, second signal correlation means also responsive to signals from said first and second rotating storage mediums for deriving an output signal corresponding to the derivative of the degree of correlation between the signals from said first and second rotating storage drums, a servo amplifier coupled to said second signal correlation means, and means coupled between said servo amplifier and said second rotating storage medium for controlling the rotation thereof to establish a predetermined synchronism between said first and second rotating storage mediums, and means coupled to said first signal correlation means for developing an output signal indicating a predetermined condition of correlation between the received signal and the signal from the second storage medium whereby the identity of said vehicular object may be determined as being the object represented by the signals from said second storage medium by a process of signal correlation.

17. In a system for determining the identity and position of an unknown vehicular object, the combination of a signal transmitting station transported by the vehicular object, said signal transmitting station including a source of repetitively occurring random signal segments corresponding to the identity of the vehicular object, at least two separate receiving stations for receiving signals from the transmitting station, at least one of said receiving stations including a second coded signal source for providing repetitively occurring random signal segments corresponding to a particular object of known identity, first signal correlation means responsive to signals from said second coded signal source and signals from a first one of said receiving stations, said first signal correlation means being adapted to identify said unknown vehicular object as being the known vehicular object represented by the signals from said second coded signal source upon the occurrence of a condition of signal correlation between the signals from said first and second coded signal sources, second signal correlation means responsive to signals from said second coded signal source and signals received by a second one of said receiving stations, signal delaying means coupled to said signal correlation means for establishing a condition of maximum signal correlation between the signals applied to the second correlation means, and means associated with said delaying means for measuring the relative time delay between the signals applied to said second correlation means whereby at least one coordinate of the position of the unknown vehicular object is determined.

18. In a system for use in transmitting signals for the identification of a signal transmitting station and the altitude thereof, the combination of a storage medium bearing coded signals corresponding to the identity of the transmitting station, said storage medium also bearing second signals having a predetermined timing relationship with respect to said coded signals, first pickup means associated with said storage medium for deriving electrical signals corresponding to the coded signals recorded thereon, second pickup means associated with said storage medium for providing electrical signals corresponding to said second signals recorded thereon, altitude measuring means linked to at least one of said pickup means for altering its position with respect to the other of said pickup means in accordance with the altitude of said transmitting station, and a signal transmitter coupled to said first and second pickup means whereby said signal transmitting station transmits a signal having a first signal component corresponding to said coded identification signal along with a second signal component having a timing relationship with respect to said first coded signal corresponding to the altitude of said transmitting station.

References Cited by the Examiner
UNITED STATES PATENTS

| | | | |
|---|---|---|---|
| 2,718,638 | 9/55 | De Rosa et al. | 343—113 |
| 2,768,372 | 10/56 | Green | 343—12 |
| 2,800,654 | 7/57 | De Rosa | 343—106 |
| 2,940,076 | 6/60 | Bissett et al. | 343—112 |

LEWIS H. MYERS, *Primary Examiner.*
CHESTER L. JUSTUS, *Examiner.*